US009464958B2

(12) United States Patent
Shue

(10) Patent No.: US 9,464,958 B2
(45) Date of Patent: Oct. 11, 2016

(54) DYNAMIC CENTER OF GRAVITY DETERMINATION

(71) Applicant: Bell Helicopter Textron Inc., Fort Worth, TX (US)

(72) Inventor: ShyhPyng Jack Shue, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/598,986

(22) Filed: Jan. 16, 2015

(65) Prior Publication Data

US 2016/0209290 A1 Jul. 21, 2016

(51) Int. Cl.
| G01C 23/00 | (2006.01) |
| B64C 27/22 | (2006.01) |
| G01M 1/12 | (2006.01) |
| B64C 29/00 | (2006.01) |
| B64C 19/00 | (2006.01) |
| B64C 27/28 | (2006.01) |

(52) U.S. Cl.
CPC .............. *G01M 1/127* (2013.01); *B64C 19/00* (2013.01); *B64C 27/28* (2013.01); *B64C 29/0033* (2013.01)

(58) Field of Classification Search
USPC .............................................. 701/3; 244/7 R
See application file for complete search history.

(56) References Cited

U.S. PATENT DOCUMENTS

| 5,054,716 A * | 10/1991 | Wilson .................. B64D 35/00 244/56 |
| 5,571,953 A | 11/1996 | Wu |
| 8,181,903 B2 * | 5/2012 | Posva .................... B64C 15/14 244/12.3 |
| 8,226,040 B2 | 7/2012 | Neto |
| 2002/0134883 A1 * | 9/2002 | Stamps ................... B64C 27/08 244/7 R |
| 2007/0221780 A1 * | 9/2007 | Builta .................... B64C 27/52 244/7 R |
| 2010/0193644 A1 * | 8/2010 | Karem .................... B64C 3/10 244/7 R |
| 2011/0180656 A1 * | 7/2011 | Shue .................. G05D 1/0077 244/17.13 |
| 2013/0192903 A1 | 8/2013 | Dubois |
| 2013/0197792 A1 | 8/2013 | Wolfram et al. |

FOREIGN PATENT DOCUMENTS

| EP | 0441007 | 12/1990 |
| EP | 0473582 | 9/1996 |
| EP | 1480043 | 5/2004 |
| EP | 2187191 | 11/2009 |

* cited by examiner

*Primary Examiner* — Thomas G Black
*Assistant Examiner* — Tyler Paige
(74) *Attorney, Agent, or Firm* — Fish & Richardson P.C.

(57) ABSTRACT

A computer-implemented method for determining center of gravity of a tiltrotor aircraft includes storing a multi-dimensional matrix mapping multiple tiltrotor aircraft parameters to a plurality of three-dimensional (3D) centers of gravity of the tiltrotor aircraft, where each 3D center of gravity includes a respective longitudinal center of gravity, lateral center of gravity, and vertical center of gravity. The method includes receiving input signals from corresponding on-board sensors, where the input signals represent characteristics of the tiltrotor aircraft, determining tiltrotor aircraft parameters from the input signals, identifying, from the multi-dimensional matrix mapping, a longitudinal center of gravity, a lateral center of gravity, and a vertical center of gravity that corresponds to the determined tiltrotor aircraft parameters, and providing the identified longitudinal center of gravity, the identified lateral center of gravity, and the identified vertical center of gravity in response to receiving the input signals.

20 Claims, 12 Drawing Sheets

DYNAMIC CENTER OF GRAVITY DETERMINATION

TECHNICAL FIELD

This disclosure relates to center of gravity estimations in aircraft, e.g., tiltrotor aircraft.

BACKGROUND

A tiltrotor aircraft often includes on-board sensors connected to multiple components of the tiltrotor aircraft to provide sensor data to a flight control computer system of the tiltrotor aircraft. Sensor data includes settings and states of the multiple components of tiltrotor aircraft, such as nacelle settings, flap settings, and weight or load settings, to determine tiltrotor aircraft parameters. Decisions about a flight of the tiltrotor aircraft can be made based on the tiltrotor aircraft parameters, such as determining a center of gravity of tiltrotor aircraft.

SUMMARY

This disclosure describes on-board tiltrotor aircraft systems for determining center of gravity of the tiltrotor aircraft.

In some aspects, an on-board tiltrotor aircraft system for determining center of gravity of the tiltrotor aircraft includes one or more computers and a computer-readable medium storing instructions executable by the one or more computers to perform operations. The operations include storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity, and vertical center of gravity. The operations include receiving a plurality of input signals from a corresponding plurality of on-board sensors, the plurality of input signals representing characteristics of the tiltrotor aircraft, determining one or more tiltrotor aircraft parameters from the plurality of input signals, identifying, from the multi-dimensional matrix mapping, a longitudinal center of gravity, a lateral center of gravity, and a vertical center of gravity that corresponds to the determined one or more tiltrotor aircraft parameters, and providing the identified longitudinal center of gravity, the identified lateral center of gravity, and the identified vertical center of gravity in response to receiving the plurality of input signals.

This, and other aspects, can include one or more of the following features. The plurality of on-board sensors can include at least one of a nacelle settings sensor, a flap settings sensor, a weight sensor, a flight sensor, a flight control sensor, an engine state sensor, or a mode sensor. The multi-dimensional matrix can include a longitudinal center of gravity matrix, and the operations can include identifying, for the tiltrotor aircraft operating in a helicopter mode, a first plurality of longitudinal centers of gravity corresponding to a first plurality of gross weight-fuselage direction pairs, identifying, for the tiltrotor aircraft operating in an airplane mode, a second plurality of longitudinal centers of gravity corresponding to a second plurality of gross weight-fuselage direction pairs, storing, in the longitudinal center of gravity matrix, the first plurality of gross weight-fuselage direction pairs and the second plurality of gross weight-fuselage direction pairs as tiltrotor aircraft parameters, and storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively. The multi-dimensional matrix can include a lateral center of gravity matrix, and the operations can include determining lateral center of gravity limits for the tiltrotor aircraft based on one or more of the plurality of tiltrotor aircraft parameters, and storing the lateral center of gravity limits in the lateral center of gravity matrix. The multi-dimensional matrix can include a vertical center of gravity matrix, and the operations can include identifying, for the tiltrotor aircraft operating in a helicopter mode, a first plurality of vertical centers of gravity corresponding to a first plurality of nacelle tilt directions, identifying, for the tiltrotor aircraft operating in an airplane mode, a second plurality of vertical centers of gravity corresponding to a second plurality of nacelle tilt directions, storing, in the vertical center of gravity matrix, the first plurality of nacelle tilt directions and the second plurality of nacelle tilt directions, and storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively. The identified longitudinal center of gravity, the identified lateral center of gravity, and the identified vertical center of gravity can be identified in real-time during flight of the tiltrotor aircraft. The operations can include determining, at a flight time instant, a rate of fuel consumption of the tiltrotor aircraft based, in part, on the identified longitudinal center of gravity, the identified lateral center of gravity, and the identified vertical center of gravity, each identified at the flight time instant. The operations can include determining, at the flight time instant, flight mode adjustments based, in part, on the determined rate of fuel consumption. The on-board tiltrotor aircraft system can be integrated into an existing computer system of the tiltrotor aircraft.

Some aspects of the subject matter described here can be implemented as a computer-implemented method for determining center of a tiltrotor aircraft. The method includes storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity, and vertical center of gravity. The method includes receiving a plurality of input signals from a corresponding plurality of on-board sensors, the plurality of input signals representing characteristics of the tiltrotor aircraft, determining one or more tiltrotor aircraft parameters from the plurality of input signals, identifying, from the multi-dimensional matrix mapping, a longitudinal center of gravity, a lateral center of gravity, and a vertical center of gravity that corresponds to the determined one or more tiltrotor aircraft parameters, and providing the identified longitudinal center of gravity, the identified lateral center of gravity and the identified vertical center of gravity in response to receiving the plurality of input signals.

This, and other aspects, can include one or more of the following features. The plurality of on-board sensors can include at least one of a nacelle settings sensor, a flap settings sensor, a weight sensor, a flight sensor, a flight control sensor, an engine state sensor, or a mode sensor. The method can include identifying, for the tiltrotor aircraft operating in a helicopter mode, a first plurality of longitudinal centers of gravity corresponding to a first plurality of gross weight-fuselage direction pairs, identifying, for the tiltrotor aircraft operating in an airplane mode, a second plurality of longitudinal centers of gravity corresponding to a second plurality of gross weight-fuselage direction pairs, storing, in a longitudinal center of gravity matrix of the multi-dimensional matrix, the first plurality of gross weight-fuselage direction pairs and the second plurality of gross weight-fuselage direction pairs as tiltrotor aircraft parameters, and storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively. The method can include determining lateral center of gravity limits for the tiltrotor aircraft based on one or more of the plurality of tiltrotor aircraft parameters, and storing the lateral center of gravity limits in a lateral center of gravity matrix of the multi-dimensional matrix. The method can include identifying, for the tiltrotor aircraft operating in a helicopter mode, a first plurality of vertical centers of gravity corresponding to a first plurality of nacelle tilt directions, identifying, for the tiltrotor aircraft operating in an airplane mode, a second plurality of vertical centers of gravity corresponding to a second plurality of nacelle tilt directions, storing, in a vertical center of gravity matrix of the multi-dimensional matrix, the first plurality of nacelle tilt directions and the second plurality of nacelle tilt directions, and storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively. The method can include determining, at a flight time instant, a rate of fuel consumption of the tiltrotor aircraft based, in part, on the identified longitudinal center of gravity, the identified lateral center of gravity, and the identified vertical center of gravity, each identified at the flight time instant. The method can include determining, at a flight time instant, a pitching angle gain schedule of the tiltrotor aircraft based, in part, on the identified centers of gravity with respect to a speed sensor failure condition.

Some aspects of the subject matter described here can be implemented as a non-transitory, computer-readable medium storing instructions operable when executed to cause at least one processor to perform operations for determining center of gravity of a tiltrotor aircraft. The operations include storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity and vertical center of gravity. The operations include receiving a plurality of input signals from a corresponding plurality of on-board sensors, the plurality of input signals representing characteristics of the tiltrotor aircraft, determining one or more tiltrotor aircraft parameters from the plurality of input signals, identifying, from the multi-dimensional matrix mapping, a longitudinal center of gravity, a lateral center of gravity, and a vertical center of gravity that corresponds to the determined one or more tiltrotor aircraft parameters, and providing the identified longitudinal center of gravity, the identified lateral center of gravity, and the identified vertical center of gravity in response to receiving the plurality of input signals.

This, and other aspects, can include one or more of the following features. The multi-dimensional matrix can include a longitudinal center of gravity matrix, and the operations can include identifying, for the tiltrotor aircraft operating in a helicopter mode, a first plurality of longitudinal centers of gravity corresponding to a first plurality of gross weight-fuselage direction pairs, identifying, for the tiltrotor aircraft operating in an airplane mode, a second plurality of longitudinal centers of gravity corresponding to a second plurality of gross weight-fuselage direction pairs, storing, in the longitudinal center of gravity matrix, the first plurality of gross weight-fuselage direction pairs and the second plurality of gross weight-fuselage direction pairs as tiltrotor aircraft parameters, and storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively. The multi-dimensional matrix can include a lateral center of gravity matrix, and the operations can include determining lateral center of gravity limits for the tiltrotor aircraft based on one or more of the plurality of tiltrotor aircraft parameters, and storing the lateral center of gravity limits in the lateral center of gravity matrix. The multi-dimensional matrix can include a vertical center of gravity matrix, and the operations can include identifying, for the tiltrotor aircraft operating in a helicopter mode, a first plurality of vertical centers of gravity corresponding to a first plurality of nacelle tilt directions, identifying, for the tiltrotor aircraft operating in an airplane mode, a second plurality of vertical centers of gravity corresponding to a second plurality of nacelle tilt directions, storing, in the vertical center of gravity matrix, the first plurality of nacelle tilt directions and the second plurality of nacelle tilt directions, and storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
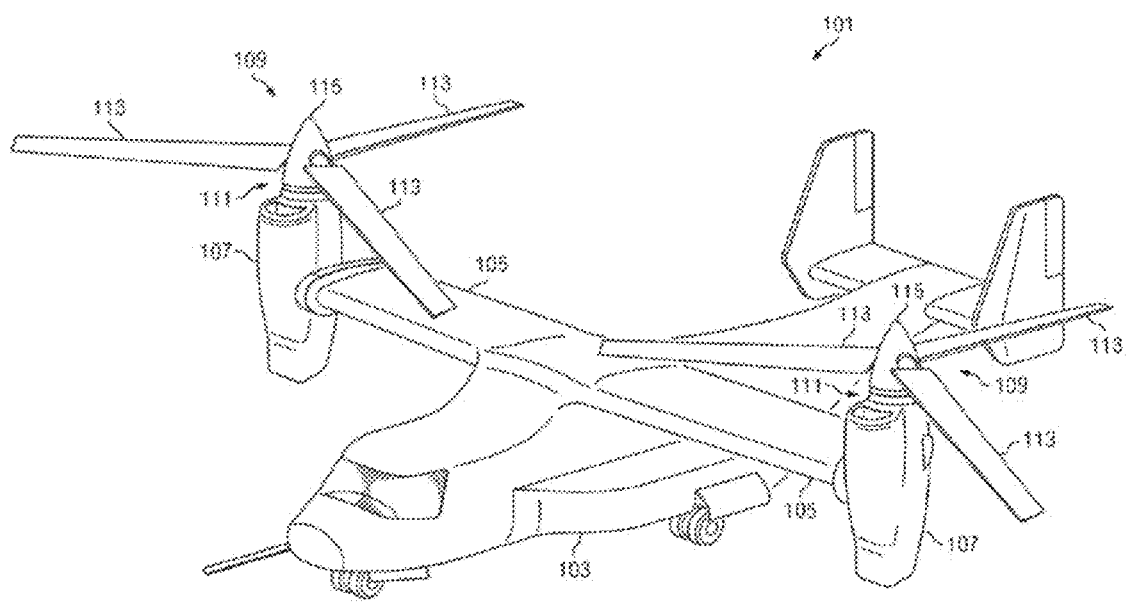
FIG. 1 is a schematic diagram of an example tiltrotor aircraft.

This disclosure describes an on-board tiltrotor aircraft system for determining center of gravity of tiltrotor aircraft, for example, by using a multi-dimensional matrix that maps multiple tiltrotor aircraft parameters to multiple three-dimensional (3D) centers of gravity of tiltrotor aircraft. A tiltrotor aircraft, such as example tiltrotor aircraft 101 of FIG. 1, often includes on-board sensors connected to multiple components of the tiltrotor aircraft to provide input signals (e.g., sensor data) to a flight control computer system of the tiltrotor aircraft. For example, the input signals correlate to settings and/or states of the multiple components of the tiltrotor aircraft, e.g., nacelle settings, flap settings, weight or load settings, flight settings, flight control settings, engine state, mode state, and/or others. The settings and/or states can affect, among other aircraft parameters, the center of gravity of the tiltrotor aircraft. The data from the sensors can be interpolated, derived, mapped, and/or otherwise compared to the multi-dimensional matrix to determine an estimated, or approximate, center of gravity of the tiltrotor aircraft. The estimated center of gravity of the tiltrotor aircraft can include a longitudinal component, a lateral component, and/or a vertical component of the center of gravity. Center of gravity estimations for aircraft can be used to determine estimated fuel consumption and optimal flight control of aircraft. In some implementations, center of gravity estimations for an aircraft are limited to a longitudinal center of gravity since the longitudinal center of gravity is often most significant, for example, in large, commercial aircraft and the like as compared to a vertical or lateral center of gravity estimation.

In some conventional aircraft systems for determining a center of gravity of an aircraft, a flight control system collects data from aircraft sensors as inputs, analyzes the data into aircraft parameters as estimation parameters, and inserts the aircraft parameters into a center of gravity algorithm that estimates the center of gravity of the aircraft for a specified time instant during aircraft flight. The center of gravity of the aircraft is sometimes considered as fixed on the aircraft with respect to all inputs. This disclosure describes an example on-board tiltrotor aircraft system for determining center of gravity of a tiltrotor aircraft by mapping tiltrotor aircraft parameters, from input signals of on-board tiltrotor aircraft sensors, with a multi-dimensional matrix. Mapping the tiltrotor aircraft parameters with the multi-dimensional matrix provides a longitudinal center of gravity estimation, a lateral center of gravity estimation, and/or a vertical center of gravity estimation during flight of the tiltrotor aircraft, for example, without computing specific algorithms or equations or dynamic transfer functions for a center of gravity during flight. Specifically, the center of gravity estimation at a flight time instant is provided during flight with minimum time-delay. The multi-dimensional matrix includes a mapping of multiple center of gravity algorithms into a matrix of multiple aircraft parameter combinations. In some implementations, since the center of gravity of an aircraft during flight is dynamic, (e.g., can vary throughout aircraft flight), determining the center of gravity estimation from the multi-dimensional matrices can optimize a fuel consumption rate, improve flight control feedback for aircraft flight stability, enhance flight performance, improve avionics indications, predict center of gravity movement estimation throughout aircraft flight, and/or improve engine performance analysis. In addition to the above, knowledge of the center of gravity estimation can help expand the aircraft flight envelope and ranges. The multiple matrix mapping technology follows a multiple input/multiple output gain schedule method which can reduce the software calculation time-delay and accelerate the entire software simplification. It can also help to avoid the logical switching design, and can be considered as a seamless and switchless design to help the entire control laws design to achieve the robustness consolidation goal without adding extra logic.

FIG. 1 is a schematic diagram of the example tiltrotor aircraft 101. The tiltrotor aircraft 101 can be used as a commercial aircraft, a military aircraft, or for other purposes. Tiltrotor aircraft 101 includes a fuselage 103 with attached wings 105. Nacelles 107 are carried at the outboard ends of wings 105 and are rotatable between a helicopter-mode position (e.g., nacelles 107 are 90 degrees from forward horizontal), as shown in FIG. 1, and a forward-facing airplane-mode position (not shown, e.g., nacelles 107 are 0 degrees from forward horizontal). Nacelles 107 carry engines and transmissions 109 for powering rotor systems 111 in rotation. It will be appreciated that an engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 includes controls, e.g., cyclic controllers and pedals, carried within a cockpit of the fuselage 103, for causing movement of the tiltrotor aircraft 101. The tiltrotor aircraft 101 can include additional or different features than depicted in FIG. 1. For example, the example tiltrotor aircraft 101 can include a weapons system, one or more on-board sensors attached to multiple components of the example tiltrotor aircraft 101 (e.g., attached to the fuselage 103, wings 105, nacelles 107, transmissions 109, rotor systems 111, blades 113, engine, controllers, pedals, rotor controls, surface controls, engine infrared ("IR") controls and/or other components), a fuel system, a drive-train system, and/or other components.

Several factors can affect the center of gravity of the example tiltrotor aircraft 101. For example, nacelle tilt angle, airspeed, weight, and/or other factors can affect the center of gravity of the example tiltrotor aircraft 101 during flight. In some implementations, the rotatable nacelles 107 of the example tiltrotor aircraft 101 can carry significant weight relative to the rest of the tiltrotor aircraft 101, such that rotating, tilting, translating, or otherwise moving the nacelles 107 affects the center of gravity of the tiltrotor aircraft 101.

Figure 2:
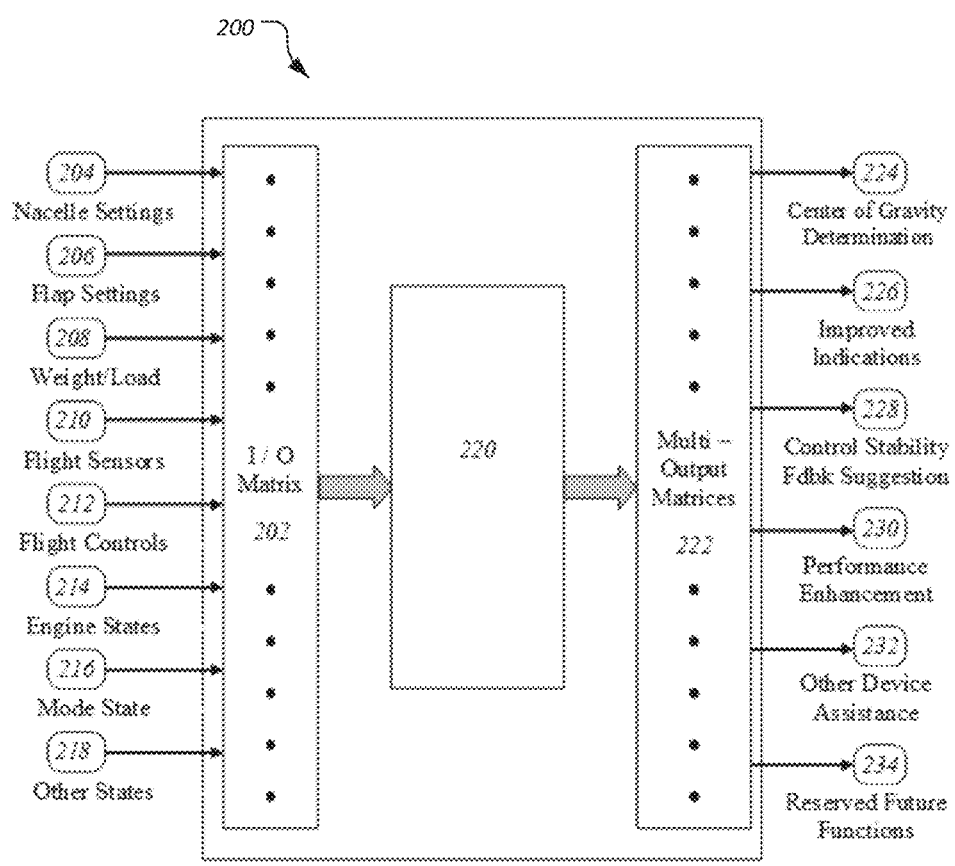
FIG. 2 is a schematic diagram of an example on-board tiltrotor aircraft system for determining center of gravity of a tiltrotor aircraft.

The example tiltrotor aircraft 101 includes an on-board tiltrotor aircraft system for determining center of gravity of the tiltrotor aircraft 101. For example, FIG. 2 is a schematic diagram of an example on-board tiltrotor aircraft system 200 for determining center of gravity of a tiltrotor aircraft, such as the tiltrotor aircraft 101 of FIG. 1. The example on-board tiltrotor aircraft system 200 can be implemented with a flight control system (e.g., flight control computer) of the example tiltrotor aircraft 101, or implemented as a separate device (e.g., computer system) on the tiltrotor aircraft 101. The on-board tiltrotor aircraft system 200 can be implemented as a computer system that includes a data processing apparatus and a computer-readable medium storing instructions executable by the data processing apparatus to perform operations.

The on-board tiltrotor aircraft system 200 stores a multi-dimensional matrix mapping multiple tiltrotor aircraft parameters to multiple three-dimensional (3D) centers of gravity of the tiltrotor aircraft 101. Each 3D center of gravity includes a respective longitudinal center of gravity, a respective lateral center of gravity, and a respective vertical center of gravity. Referring to FIG. 1, longitudinal refers to a direction along the fuselage 103 of the tiltrotor aircraft 101 generally from a rear of the tiltrotor aircraft 101 to a front of the tiltrotor aircraft 101. The longitudinal center of gravity correlates to the center of gravity of the tiltrotor aircraft 101 along a longitudinal axis of the tiltrotor aircraft 101. Lateral refers to a direction along the wings 105 of the tiltrotor aircraft generally from one side of the tiltrotor aircraft to the other. For example, an example lateral axis can pass through each nacelle 107 of the tiltrotor aircraft 101. The lateral center of gravity correlates to the center of gravity of the tiltrotor aircraft 101 along a lateral axis of the tiltrotor aircraft 101. Vertical refers to a direction from a bottom of the tiltrotor aircraft 101 to a top of the tiltrotor aircraft 101. The vertical center of gravity correlates to the center of gravity of the tiltrotor aircraft 101 along a vertical axis of the tiltrotor aircraft 101.

Referring back to the example on-board tiltrotor aircraft system 200 of FIG. 2, the multi-dimensional matrix includes an input-output matrix 202 to receive one or more input signals from one or more on-board sensors on the tiltrotor aircraft 101. The input signals correspond to characteristics of the tiltrotor aircraft 101. In FIG. 2, the input signals include nacelle settings 204 from a nacelle sensor, flap settings 206 from a wing flap sensor, weight-load settings 208 from a weight sensor and/or load sensor, flight settings 210, flight control settings 212, engine settings 214 from an engine state sensor, control mode settings 216, and other settings 218 affecting a weight of the tiltrotor aircraft 101. However, the input signals can include additional or different settings than depicted in FIG. 2. The on-board tiltrotor aircraft system 200 can be connected to the on-board sensors and output devices of the tiltrotor aircraft 101. The output devices can provide, for example, display outputs on the tiltrotor aircraft 101.

The nacelle settings 204 can include characteristics of the nacelles 107, such as the nacelle tilt angle and nacelle tilting rate. For example, the nacelles 107 can be at a fixed angle, changeable based on a flight state of the tiltrotor aircraft 101, or manually controlled (e.g., by a pilot) to a specified tilt angle. Differential nacelle tilt angles with respect to aircraft weight from the left and right side can also be considered as an input data if flight control laws include this kind of control function. The flight settings 210 can include standard aircraft sensors, such as pitch, roll, yaw rates and attitudes, x, y, z velocities and accelerations, altitude sensors, and positions. The flight control settings 212 can include a flight control stick position (e.g., lateral, longitudinal, vertical, thrust, left/right ("L/R") nacelle positions, and/or pedal position), a flight control in detent (e.g., the pilot control stick is relaxed in a hold flight mode) or out of detent (e.g., the pilot uses the stick in a maneuver flight mode), a flight control actuator position, weapon system settings (e.g., weapon system arm position or angle), and/or other flight controls. The engine settings 214 can include characteristics of the engine or engines of the tiltrotor aircraft 101, such as engine revolutions per minute (RPM), engine torque, engine IR (infrared) controls, engine health (e.g., stable, failing, and/or other state), engine temperature, engine lubricant temperature, fuel flow consumption rate, air temperature and density, and/or other engine characteristics. The control mode settings 216 can include flight characteristics in aircraft flight control laws (CLAWS), including logic states (e.g., rate command mode, rate command attitude mode, turn coordination on-off state, and/or others) on each axis (e.g., longitudinal, lateral, and vertical), a maneuvering mode, an automatic flight control system (AFCS), a navigation flight or waypoint flight, airplane mode, helicopter mode, hybrid mode, operation at cruise speed, hold modes, maneuvering operations, and/or other modes. The control mode settings 216 can include a control logical algorithm design which can make the aircraft hold on all four axes, such as longitudinal speed hold, lateral speed hold, directional heading hold, and vertical altitude hold in the low speed condition (i.e., 45 knots or lower). Similarly, in the high speed condition (i.e., 55 knots or higher), the control mode settings 216 can help to automatically achieve longitudinal speed hold, lateral heading hold or bank angle turn, directional sideslip hold or zero, and vertical altitude hold. The airspeeds between about 45 and 55 knots are defined as a transition latch area, for example, to buffer the CLAWS system from switching on/off too quickly.

Figure 3A:
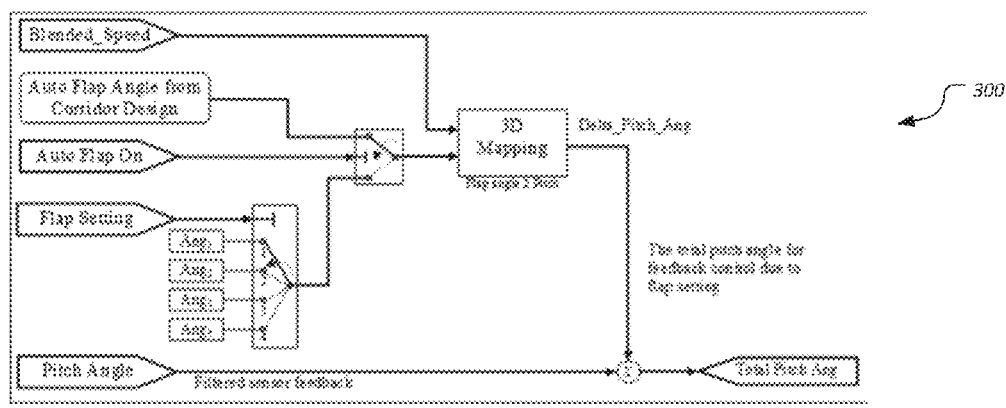
FIG. 3A is a schematic flowchart for determining pitch angle effect of an example tiltrotor aircraft.

The flap settings 206 can include characteristics of wing flaps on the wings 105 of the tiltrotor aircraft 101, such as a flap angle or position. For example, the wing flaps can be at a fixed angle or position, automatically controlled or changeable based on a flight state of the tiltrotor aircraft 101, or manually controlled (e.g., by a pilot) to a specified angle or position. Example flight states of the tiltrotor aircraft include ignition, take-off, cruise, ascent, descent, banking, landing, and others. A pitch angle of the tiltrotor aircraft 101 can change with respect to the flap settings 208 (e.g., wing flap angle). The flap angle can change the pitch of the tiltrotor aircraft 101, for example, to vary the airspeed of the tiltrotor aircraft 101. For example, in instances when an automatic flap system is on, the pitch angle will be affected by the wing flap angle and a blended speed of the tiltrotor aircraft 101. The blended speed is calculated from ground speed (e.g., from EGI) and airspeed (e.g., from an air data computer by using pitot tube). EGI is defined as Enhanced GPS and INS, where GPS is Global Positioning System and INS is Inertial Navigation System. The flap settings can be controlled by automatic control or manual control, for example, by a pilot in a cockpit of the tiltrotor aircraft 101. FIG. 3A depicts a schematic flowchart 300 for determining pitch angle effect based on flap settings 206 and the blended speed of the example tiltrotor aircraft 101. As shown in FIG. 3A, if an Auto Flap On function is true, the flap angle will be controlled automatically. Otherwise, the flap angle can be controlled manually by cockpit controls. In auto flap control, the flap angle can be determined to optimize the tiltrotor aircraft 101 with minimum drag pitch angle conditions, while still satisfying an aircraft corridor design.

Figure 3B:
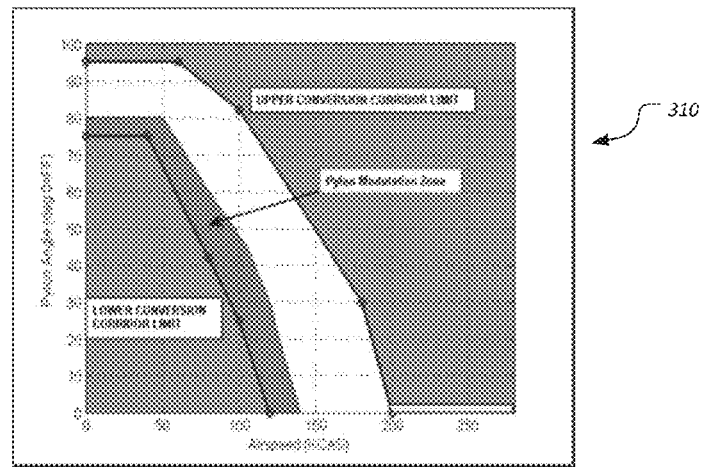
FIG. 3B is an example corridor protection chart based on nacelle tilt angle and airspeed of an example tiltrotor aircraft.

The aircraft corridor design includes two functions. The first function is manually controlled by a pilot using a nacelle beep function on a cyclic controller of the tiltrotor aircraft 101. The second function is to set the nacelle tilt to be automatically controlled, for example, such that the system will provide the optimal nacelle tilt angle following its associated airspeed with corridor envelope protection. An example corridor protection chart 310 based on the nacelle tilt angle and airspeed regions is shown in FIG. 3B. In FIG. 3B, the vertical axis is the nacelle tilt angle and the horizontal axis is the airspeed or blended speed. In the example corridor protection chart 310, when airspeed is higher than 60 knots, the blended speed is equal to airspeed. When nacelle tilt angle reaches the down-lock position (0 deg), the airplane mode (i.e., forward flight ("FF") mode) will allow the aircraft to accelerate, for example, up to 280 knots. In this acceleration period, the flap can be fully up with auto flap function.

Referring back to FIG. 2, a central control unit 220 (e.g., computer, processor, and/or other processing unit) of the on-board tiltrotor aircraft system 200 determines one or more tiltrotor aircraft parameters from the input signals. The multi-dimensional matrix of the on-board tiltrotor aircraft system 200 also includes a multi-output matrix 222 that includes a mapping of multiple center of gravity algorithms corresponding to multiple combinations of the tiltrotor aircraft parameters. The central control unit 220 identifies, from the mapping of the multi-output matrix 222, a center of gravity estimation 224 of the tiltrotor aircraft 101 that corresponds to the one or more tiltrotor aircraft parameters from the input signals. The center of gravity estimation 224 includes a longitudinal center of gravity, a lateral center of gravity, and a vertical center of gravity. In some implementations, such as depicted in FIG. 2, outputs of the on-board tiltrotor aircraft system 200 include the center of gravity estimation 224, updated indications 226 to a pilot of the tiltrotor aircraft 101, control stability feedback 228, performance enhancement 230 of the tiltrotor aircraft 101, other device assistance 232, and reserve future functions 234. These additional reserved functions can be associated with improvement of unmanned aircraft, such as automatic load and envelope limiting system based on various center of gravity situations. The on-board tiltrotor aircraft system 200 can provide the outputs, for example, to a flight control system of the tiltrotor aircraft 101, to cockpit displays in the tiltrotor aircraft 101, and/or to other components of the tiltrotor aircraft 101. In some implementations, the center of gravity output positions in the longitudinal, lateral and vertical axes help determine the minimum drag of aircraft flight maneuvers, where the minimum drag can be automatically applied to control laws such that the range of aircraft can be increased.

The on-board tiltrotor aircraft system 200 provides the outputs, such as the center of gravity estimation 224, in response to receiving the input signals from the on-board sensors. In some implementations, the outputs are provided in response to the input signals at specified flight time instants. For example, the input signals can be provided to the on-board tiltrotor aircraft system 200 at a specified frequency such that the outputs are provided at the same specified frequency corresponding to the specified flight time instants. In some implementations, the on-board tiltrotor aircraft system 200 receives the input signals in substantially real time (e.g., at a very high frequency, instantaneously, and/or continuously received), and the outputs are provided in substantially real time or at a specified flight time instant based on the substantially real-time input signals.

In some implementations, the multi-output matrix 222 includes separate center of gravity matrices for one or more components of the center of gravity estimation 224. For example, the multi-output matrix 222 can include a longitudinal center of gravity matrix, a lateral center of gravity matrix, and a vertical center of gravity matrix.

The longitudinal center of gravity matrix includes multiple longitudinal centers of gravity corresponding to multiple gross weight-fuselage direction pairs for the tiltrotor aircraft 101 in helicopter mode, in airplane mode, and/or in conversional mode positions (i.e., intermediate positions), as shown in FIG. 3B, between helicopter mode and airplane mode. For example, a first set of gross weight-fuselage direction pairs can correspond to the helicopter mode of the tiltrotor aircraft 101, a second set of gross weight-fuselage direction pairs can correspond to the airplane mode of the tiltrotor aircraft 101, and a third set of gross weight-fuselage direction pairs can correspond to a state of the tiltrotor aircraft 101 between helicopter mode and airplane mode. In some examples, a state of the tiltrotor aircraft 101 between helicopter mode and airplane mode includes a nacelle tilt angle between 0 degrees and 90 degrees, such as 30 degrees, 45 degrees, 60 degrees, or another angle. The multiple gross weight-fuselage direction pairs for the tiltrotor aircraft 101 are stored in the longitudinal center of gravity matrix as tiltrotor aircraft parameters. Longitudinal centers of gravity are also stored in the longitudinal center of gravity matrix, where each longitudinal center of gravity corresponds to one or more of the gross weight-fuselage direction pairs for the tiltrotor aircraft 101 in helicopter mode, airplane mode, or at intermediate positions between helicopter mode and airplane mode.

Figure 4:
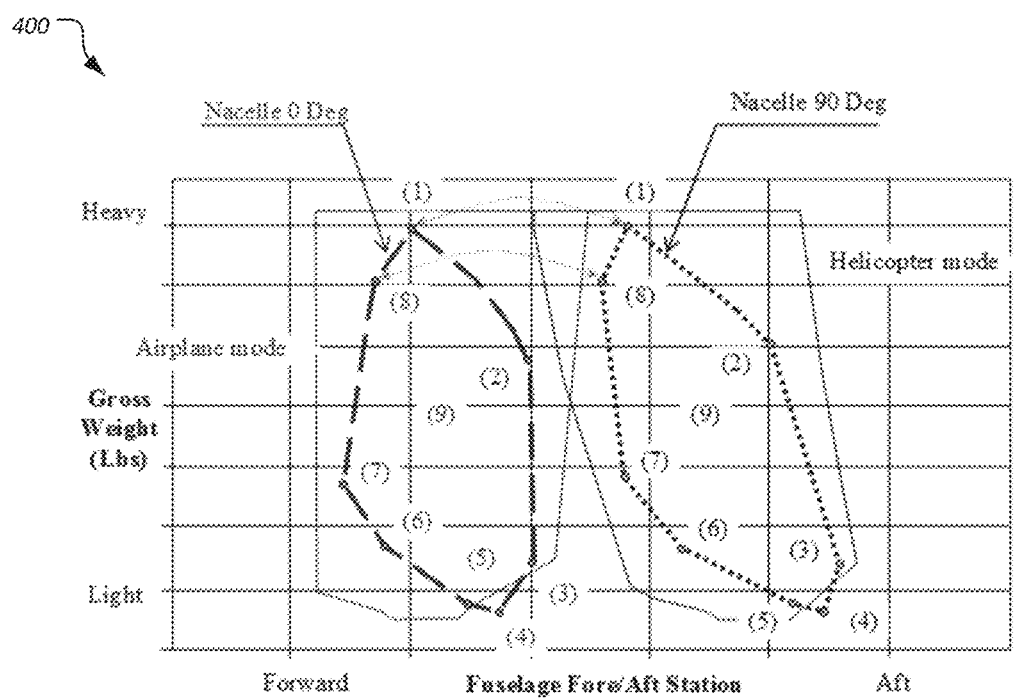
FIG. 4 is a longitudinal center of gravity plot for an example tiltrotor aircraft.

An example set of gross weight-fuselage direction pairs for the tiltrotor aircraft 101 in helicopter mode and in airplane mode is shown in Table 1 and represented by the longitudinal center of gravity plot 400 of FIG. 4.

TABLE 1

Example Gross Weight-Fuselage Direction Pairs

| Pair | Helicopter Mode | Airplane Mode | Longitudinal Center of Gravity Difference Between Modes |
|---|---|---|---|
| 1 | (FWD, Heavy) | (FWD, Heavy) | Airplane mode 8 inches FWD |
| 2 | (Aft, Mid) | (Aft, Mid) | Airplane mode 10.1 inches FWD |
| 3 | (Aft, Light) | (Aft, Light) | Airplane mode 13.5 inches FWD |
| 4 | (Aft, Light) | (Aft, Light) | Airplane mode 14.8 inches FWD |
| 5 | (Aft, Light) | (Aft, Light) | Airplane mode 14.2 inches FWD |
| 6 | (FWD, Light) | (FWD, Light) | Airplane mode 12.5 inches FWD |
| 7 | (FWD, Light) | (FWD, Light) | Airplane mode 11.2 inches FWD |
| 8 | (FWD, Heavy) | (FWD, Heavy) | Airplane mode 8.8 inches FWD |
| 9 | (Mid, Mid) | (Mid, Mid) | Airplane mode 11 inches FWD |

The example set of Table 1 includes nine gross weight-fuselage direction pairs. In some implementations of the longitudinal center of gravity matrix, more than nine or less than nine gross weight-fuselage direction pairs can be used. Referring to both FIG. 4 and Table 1, the nine gross weight-fuselage direction pairs include a longitudinal center of gravity location (e.g., "FWD," "Aft," "Mid," and/or other), a weight of the tiltrotor aircraft (e.g., "Heavy," "Mid," "Light," and/or other), and a relative distance between the longitudinal centers of gravity for the tiltrotor aircraft 101 in helicopter mode and in airplane mode. FIG.

4 depicts the differences in longitudinal center of gravity location for the nine gross weight-fuselage direction pairs for helicopter mode and airplane mode of the tiltrotor aircraft 101. Although FIG. 4 and Table 1 include data for the example gross weight-fuselage direction pairs for only helicopter mode (nacelle tilt angle of 90 degrees) and airplane mode (nacelle tilt angle of 0 degrees), the gross weight-fuselage direction pairs can include data for additional or different modes of the tiltrotor aircraft 101, such as a hybrid mode where the nacelle tilt angle is between 0 degrees and 90 degrees.

Figure 5:
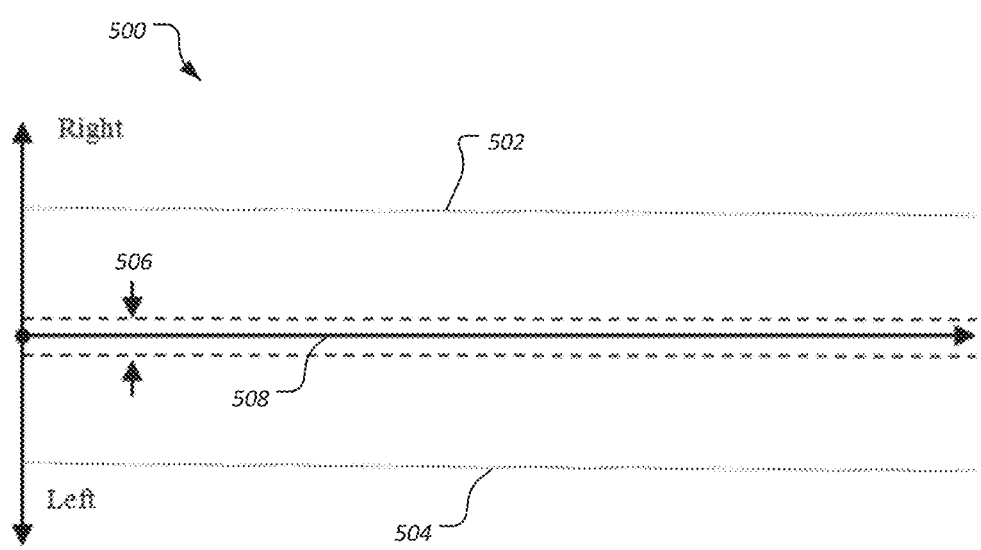
FIG. 5 is a lateral center of gravity plot for an example tiltrotor aircraft.

The lateral center of gravity matrix can include stored lateral center of gravity limits for the tiltrotor aircraft 101 based on one or more of the tiltrotor aircraft parameters. In some implementations, the lateral center of gravity of tiltrotor aircraft, and other aircraft types, are substantially laterally symmetric. A distance between an actual lateral center and the lateral center of gravity of the tiltrotor aircraft 101 can be limited, and lateral center of gravity limits (e.g., maximum estimated lateral center of gravity distances from an actual lateral center) can be dependent on multiple characteristics of the tiltrotor aircraft 101, such as aircraft weight, lateral weight distribution, structural load, passenger sitting, fuel transfers, weapon system location, and/or other weight parameters of the tiltrotor aircraft 101. In certain implementations, the weight parameters are laterally fixed in position, thus making the lateral center of gravity position substantially fixed. The lateral center of gravity of the tiltrotor aircraft 101 can be laterally centered on the tiltrotor aircraft 101 or laterally off-center from the tiltrotor aircraft 101. In some implementations, the lateral center of gravity limits are predetermined, or pre-calculated, based on the tiltrotor aircraft parameters of the tiltrotor aircraft 101, and stored in the lateral center of gravity matrix. For example, FIG. 5 is a lateral center of gravity plot 500 showing a right lateral center of gravity limit 502, a left lateral center of gravity limit 504, and a dead band area 506. The dead band area 506 correlates to a tolerance distance between the actual lateral center 508 of an aircraft and the lateral center of gravity of the aircraft, where the tolerance distance negligibly affects aircraft flight. Multiple right center of gravity limits and left center of gravity limits can be stored in the lateral center of gravity matrix corresponding to combinations of tiltrotor aircraft parameters. For example, when one side of passenger load is heavier than the other side, the lateral C.G. different will be automatically determined by the desired algorithm. Similarly, if a weapon on one side of an aircraft is fired during a combat situation, the differential lateral center of gravity difference will be generated because of weight shifting. These static and dynamic lateral center of gravity changes can be automatically determined based on sensor inputs and control outputs using the matrix mapping technology.

Figure 6:
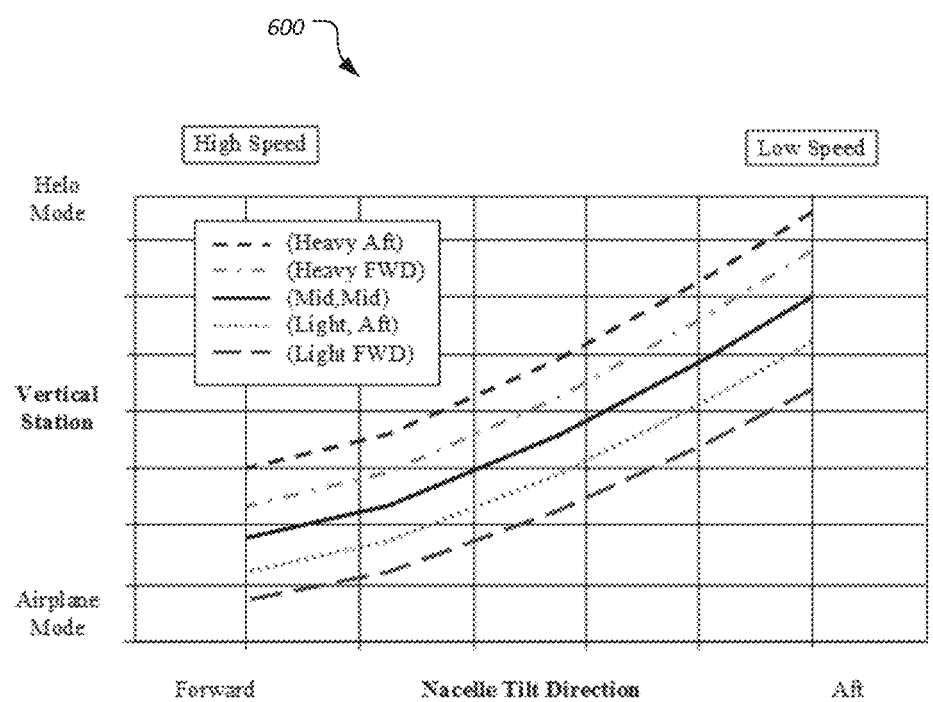
FIG. 6 is vertical center of gravity plot for an example tiltrotor aircraft.

The vertical center of gravity matrix can include stored vertical centers of gravity corresponding to at least one of multiple nacelle tilt angles of the tiltrotor aircraft 101, weight characteristics of the tiltrotor aircraft 101, or the longitudinal center of gravity estimation. In some implementations, the nacelle tilt angles include 0 degrees (e.g., airplane mode), 90 degrees (e.g., helicopter mode), and intermediate nacelle tilt angles between 0 degrees and 90 degrees. FIG. 6 is an example vertical center of gravity plot 600 showing example vertical center of gravity estimations based on nacelle tilt angle, weight of the tiltrotor aircraft 101, and the longitudinal center of gravity estimation of the tiltrotor aircraft 101. Specifically, FIG. 6 displays vertical center of gravity estimations for five weight and longitudinal center of gravity combinations, the vertical center of gravity estimations varying as the nacelle tilt direction varies. The horizontal axis (x-axis) corresponds to the nacelle tilt angle, where the right side of the x-axis approaches helicopter mode of the tiltrotor aircraft 101 and the left side of the x-axis approaches airplane mode of the tiltrotor aircraft 101. The vertical axis (y-axis) corresponds to the vertical center of gravity estimation. In some implementations, as the nacelles tilt forward (e.g., toward 0 degrees), the vertical center of gravity estimation will become lower on the vertical axis because a center of gravity of the nacelles shifts vertically downward with the downward rotation of the nacelles. Similarly, as the nacelles tilt backward (e.g., toward 90 degrees), the vertical center of gravity estimation will become higher on the vertical axis because the center of gravity of the nacelles shifts vertically upward with the upward rotation of the nacelles. The vertical center of gravity estimation can affect the pitch angle of the tiltrotor aircraft 101, as described above, weapon firing angles, and wing flap angles, for example, while using elevator control of the tiltrotor aircraft 101 in airplane mode and longitudinal cyclic tilt control of the tiltrotor aircraft 101 in helicopter mode. Elevator control is a control surface function on a tail area through forward/aft longitudinal control stick input of the aircraft in airplane mode. The elevator control deflection provides the aircraft with blended function of vertical controls and horizontal speed changes. The combination of elevator controls and thrust settings can make aircraft fly to a vertical altitude hold and horizontal speed hold function in airplane mode.

Figure 7:
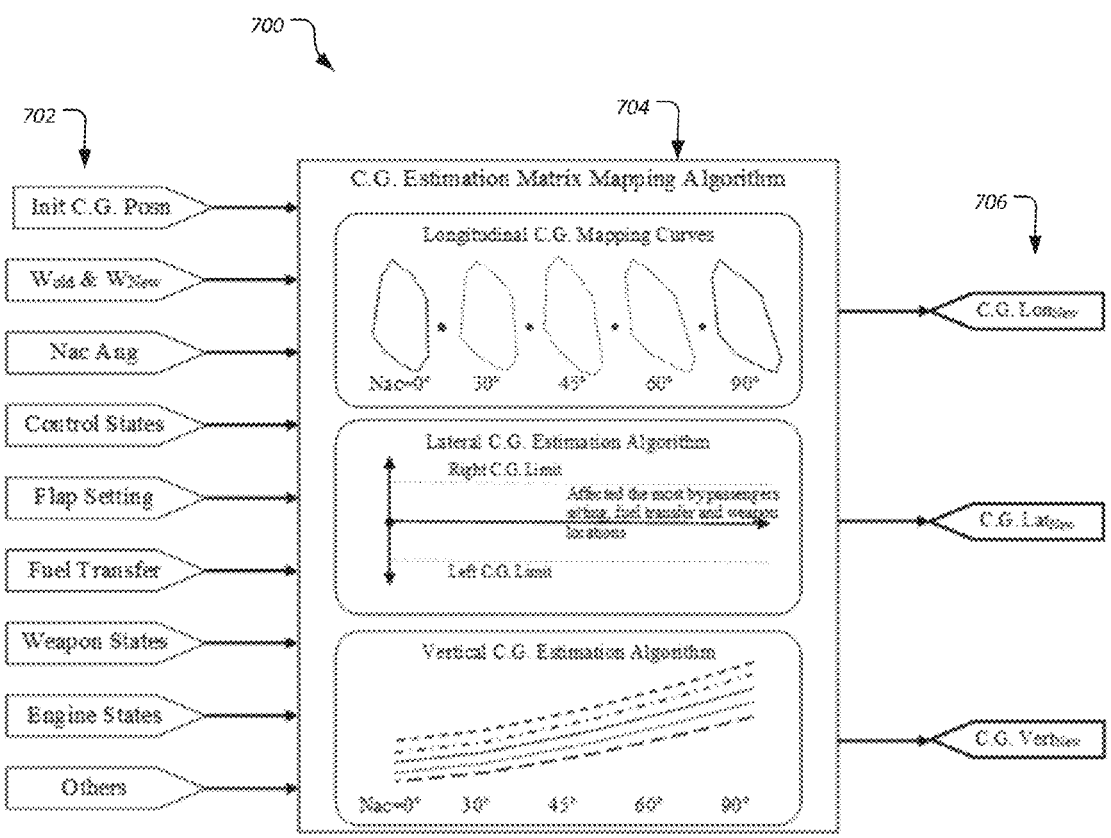
FIG. 7 is a schematic diagram mapping tiltrotor aircraft parameters to center of gravity matrices.
Figure 8A:
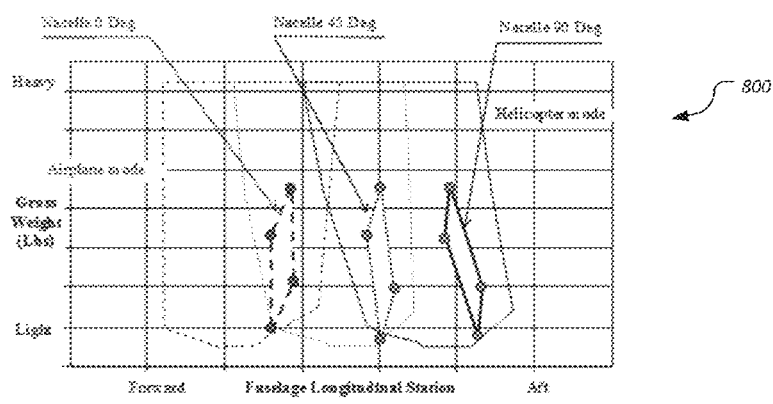
FIGS. 8A and 8B are example plots showing fuel consumption of a tiltrotor aircraft with respect to a longitudinal center of gravity (x-axis) and an aircraft weight (y-axis).
Figure 8B:
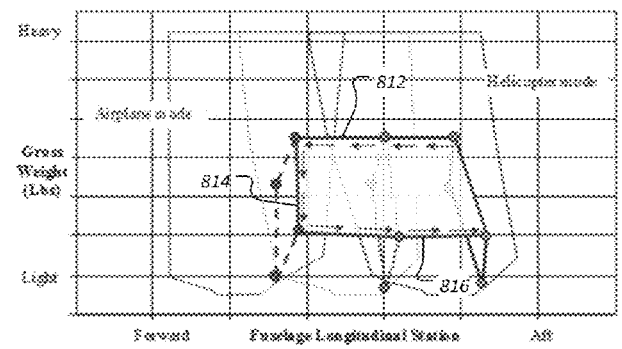

In some implementations, the on-board tiltrotor aircraft system 200 identifies the input signals from sensors on the tiltrotor aircraft 101, determines tiltrotor aircraft parameters from the input signals, and maps the tiltrotor aircraft parameters to the data in the multi-dimensional matrix to determine a center of gravity estimation of the tiltrotor aircraft 101 in the form of longitudinal center of gravity estimation, a lateral center of gravity estimation, and a vertical center of gravity estimation. For example, an example schematic 700 of mapping the tiltrotor aircraft parameters to center of gravity matrices is shown in FIG. 7, where tiltrotor aircraft parameter inputs 702 are inputted into a center of gravity estimation matrix mapping algorithm 704, with the outputs 706 including the longitudinal center of gravity estimation, the lateral center of gravity estimation, and the vertical center of gravity estimation. In some implementations, identifying the center of gravity of the tiltrotor aircraft 101 during flight (e.g., at a specified flight time instant) can lead to determinations of other aircraft outputs. For example, estimations for the longitudinal center of gravity, lateral center of gravity, and/or vertical center of gravity from the multi-dimensional matrix can be used, at least in part, to determine a rate of fuel consumption of the tiltrotor aircraft 101. As mentioned above, the estimations for the centers of gravity of the tiltrotor aircraft 101 can be determined at specified flight time instants or in real time. Similarly, the rate of fuel consumption of the tiltrotor aircraft 101 can be determined at specified flight time instants or in real time. FIGS. 8A and 8B are plots 800 and 810, respectively, showing example fuel consumption of tiltrotor aircraft 101 with respect to longitudinal center of gravity (x-axis) and aircraft weight (y-axis).

FIGS. 8A and 8B depict an example of how the tiltrotor aircraft 101 consumes fuel in helicopter mode with the nacelles 107 at 90 degrees, in a hybrid mode with the nacelles 107 at 45 degrees, and in airplane mode with the nacelles 107 at 0 degrees. In FIG. 8A, the three nacelle tilt conditions are used to represent a weight shift in fuel consumption under multiple flight conditions. For example, if the aircraft takes off in the helicopter mode from (Mid, Mid) condition (i.e., Mid longitudinal center of gravity and Mid weight), immediately tilting the nacelles 107 forward to 45 degrees and further to 0 degrees for airplane mode causes the center of gravity of the tiltrotor aircraft 101 to follow the top curve 812 shown in FIG. 8B. In some implementations, it is assumed that the tiltrotor aircraft 101 consumes most of its fuel in airplane mode flight. A vertical curve 814 and a bottom curve 816 of FIG. 8B indicate how the center of gravity shifts during a steady state flight (vertical curve 814) of the tiltrotor aircraft 101 in airplane mode, and a transition back to helicopter mode (bottom curve 816), for example, as the tiltrotor aircraft 101 hovers and lands at a destination. Although the three nacelle angles depicted in FIGS. 8A and 8B are representative of a complete flight of the tiltrotor aircraft 101, the center of gravity curves can be linearly interpolated throughout the entire nacelle tilt envelope. Nacelle tilt angles of FIGS. 8A and 8B are related to FIG. 6 for the tiltrotor corridor design. For example, during helicopter mode of the aircraft 101 up to 60 knots, the nacelle tilt angle of 95 degrees to 75 degrees will be allowed as shown in FIG. 3B. If a higher nacelle angle was manually used to achieve this low speed flight envelope, the lower pitch angle will be used by CLAWS to help holding such maneuver during the low speed. However, if the auto-flapping and auto nacelle functions are used, then the CLAWS can select the optimized path and minimum drag which will be close to the center line of corridor in FIG. 3B. Likewise, the conversional mode and airplane mode with auto-flap and auto nacelle function as shown in FIG. 3B can make the aircraft follow through the center corridor line. The upper corridor line of FIG. 3B is the upper limit of nacelle angle through speed schedule, and the lower corridor line in FIG. 3B is the lower boundary line of nacelle angle. In instances where the nacelle angles are manually controlled, the manual nacelle tilt function is used, and the aircraft will follow lower boundary protection line to accomplish maneuvers. All limit protection functions can be naturally built in CLAWS. In some implementations, such as identified from FIGS. 8A and 8B, fuel consumption in steady state airplane mode flight of tiltrotor aircraft 101 causes negligible center of gravity shift, and steady state helicopter mode flight of tiltrotor aircraft 101 can change the center of gravity position from, for example, (Mid, Mid) to (Mid-Aft, Light).

Figure 9:
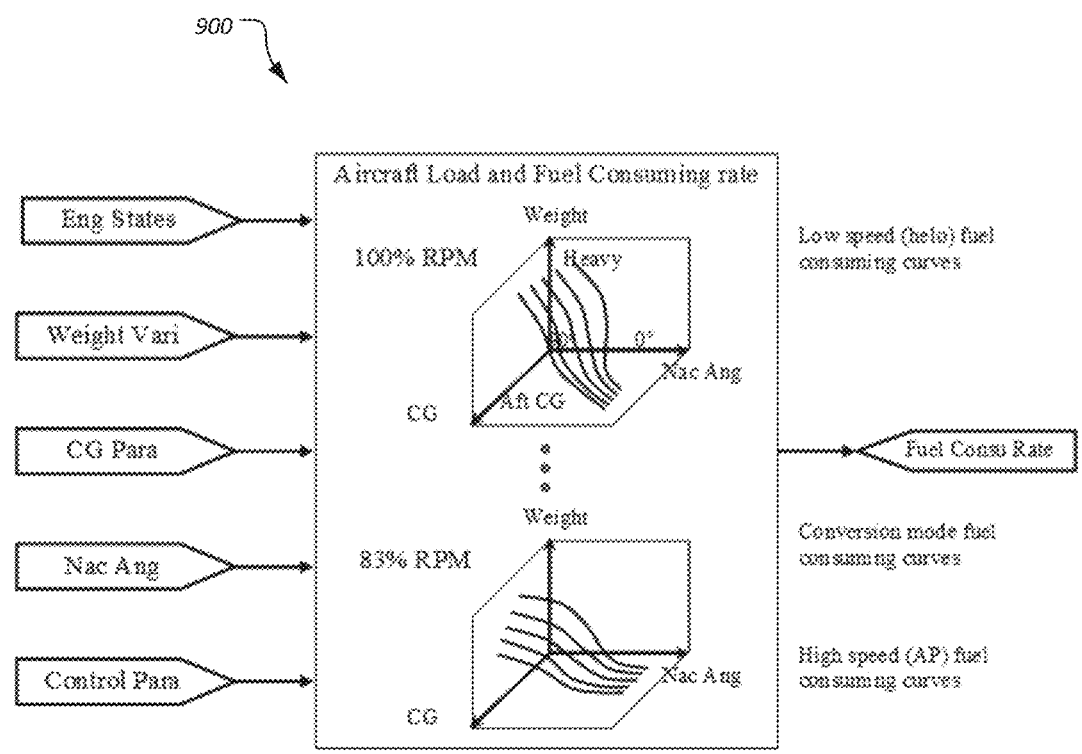
FIG. 9 is a schematic diagram of search algorithm inputs in a curve mapping of flight conditions for a fuel consumption rate estimate.

Fuel consumption rates, based at least in part on internal engine parameters, can be defined as multiple nonlinear curves with respect to engine RPM and engine IR controls. IR (infrared) controls are defined as infrared control (engine thermal signature reduction control) to avoid IR radar detection, for example, during combat, attack, and low ground maneuvers of an aircraft. These engine performance curves are knowledge-based from engine manufacturers and treated as finite multiple curves with respect to all related variables to be searched for fuel consuming rate estimation. To correctly implement engine curves into a control database, engine settings and characteristics, along with other data, should be determined. For example, as depicted in engine curve plot 900 of FIG. 9 with respect to IR engine control efficient curves, engine control parameters, collective and control settings, nacelle angle, initial aircraft take-off weight and updated weight, and initial approximate center of gravity location and updated center of gravity location can be used as inputs to determine a curve mapping from one flight condition to another for a fuel consumption rate estimate. In some implementations, fuel consumption rate estimates can form the basis of flight mode adjustments during flight of the tiltrotor aircraft 101. For example, a trend of increasing fuel consumption rate estimates during a flight mode (e.g., steady state cruising in airplane mode) can suggest to a pilot of the tiltrotor aircraft 101 that adjustments to the aircraft pitch angle, flap angle, weapon system location, and/or other setting or state should be performed. In some examples, the minimum drag and maximum engine efficient curve can be used to achieve this maneuver.

Figure 10A:
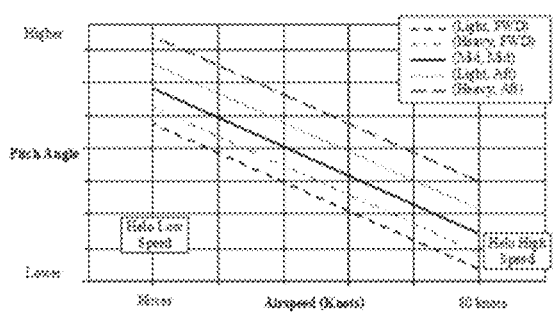
FIGS. 10A-10C are example helicopter mode pitch angle plot, flap angle plot, and airplane mode pitch angle plot, respectively, for an example tiltrotor aircraft.
Figure 10B:
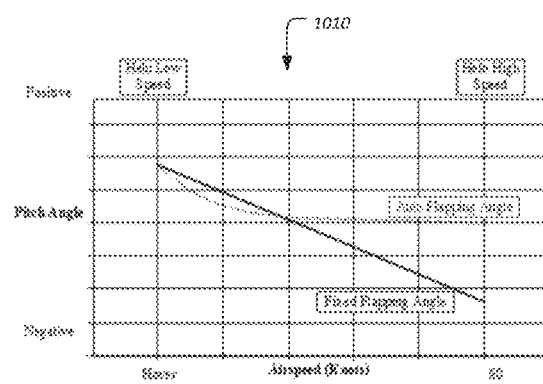
Figure 10C:
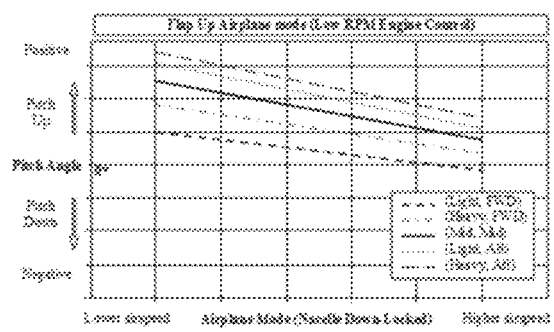

In some implementations, methods of multiple mapping technology starts from the pitch angle of an aircraft for a fixed weight condition. For example, the changes of the aircraft pitch angle can make aircraft reach various airspeeds, which affects the aircraft fuel consumption rate and the total range of flight. The pitch angle for the example tiltrotor aircraft 101 with a fixed nacelle angle at 90 degrees (i.e., helicopter mode) and fixed flap angle at 65 degrees is shown in a pitch angle plot 1000 in FIG. 10A. In the pitch angle plot 1000 of FIG. 10A, the y-axis is the pitch angle with upper direction to be higher pitch angle, and the x-axis is the airspeed in helicopter mode without auto nacelle and auto flap functions. The five linear curves in FIG. 10A are the center of gravity relations with respect to weights, which are the cases of (Light, FWD), (Heavy, FWD), (Mid, Mid), (Light, Aft), and (Heavy, Aft). Over these five weights and center of gravity combinations, the aircraft pitch angles from hover to low speed of 80 knots change approximately between 4 to 5 degrees for the fixed nacelle angle of 90 degrees and the fixed flap setting of 65 degrees. In this entire helicopter flight region, the engine fuel consuming rate is considered as the worst scenario of flights. If an auto flap function is used, the pitch angle can change from a linear curve to a nonlinear curve as shown in the flapping angle plot 1010 of FIG. 10B. FIG. 10C is a second pitch angle plot 1020 similar to the pitch angle plot 1000 of FIG. 10A, except the second pitch angle plot 1020 of FIG. 10C shows the pitch angle for the example tiltrotor aircraft 101 with a fixed nacelle angle at 0 degrees (airplane mode) and a fixed flap angle.

Figure 11:
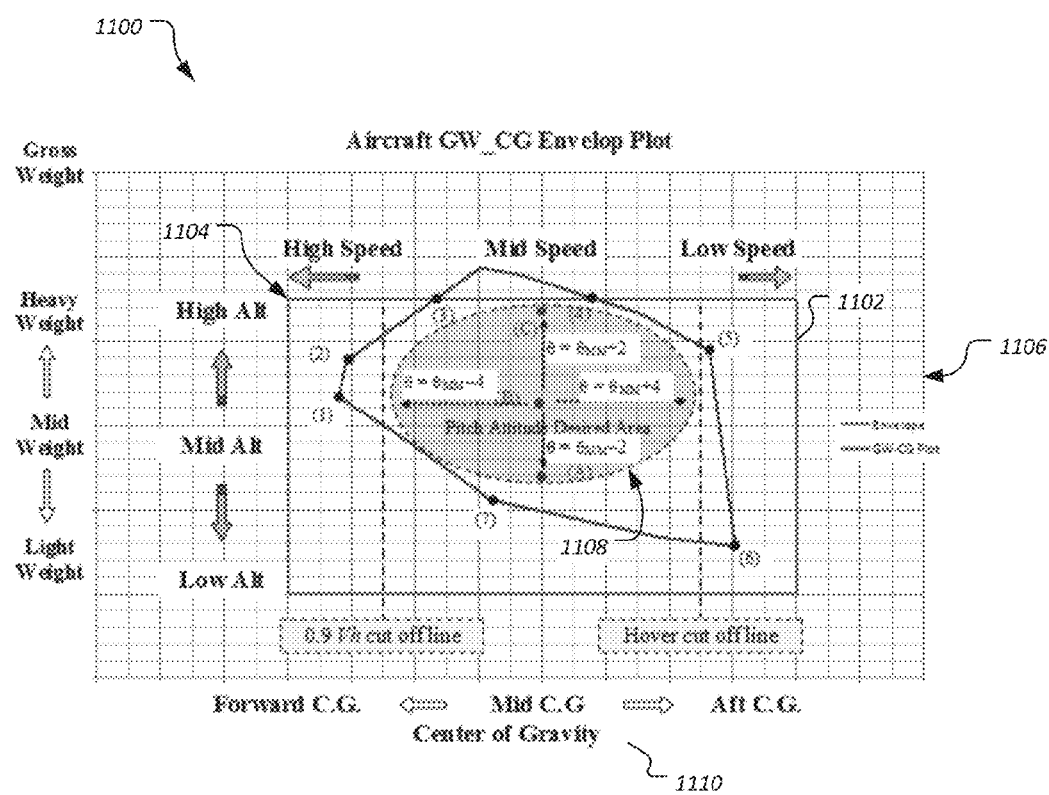
FIG. 11 is a simplified example plot of center of gravity estimations of an aircraft with its flight envelope for airspeed sensor failure mode.

In some implementations, determining airspeed with respect to pitch angle generates a good transition impact, for example, when airspeed sensor failure occurs. As mentioned previously, aircraft pitch angle can be affected by aircraft center of gravity, wind magnitude and direction, air density, control settings, and/or other factors. A relationship plot 1100 of center of gravity estimations of an aircraft with its flight envelope 1102, for example, for tiltrotor aircraft 101, is shown in FIG. 11. In FIG. 11, seven boundary points denoted as (1) to (7) and three mid points defined as (A) to (C) are shown. There are two rectangle blocks in FIG. 11 that make two vertical and horizontal axes. The inner rectangle block 1104 displays the relationship between the airspeed and altitude. The outer rectangle block 1106 shows the relationship between aircraft weight and center of gravity location. The boundary points (1) to (7) can determine relations of center of gravity/weight location with respect to airspeed/altitude flight envelope 1102. The mid points of (A) to (C) are best representative for the mid center of gravity/weight with the desired airspeed/altitude flight envelope, since they make the aircraft pitching angle close to minimum drag area. For example, the highest airspeed will take place when aircraft is approximate at the (Mid weight, Forward center of gravity, and mid Altitude) which represents the boundary point (1) or (2). Similarly, when the aircraft is too heavy and altitude is too high, the fastest airspeed will drop to point (3). In this case, the aircraft is not allowed to have too much forward or aft center of gravity.

In some implementations, the desired knowledge-based pitch attitude angle to replace airspeed speed gain schedule is pre-calculated between 0.9 Vh and hover two cut-off dash lines, as shown in FIG. 11. Holding pitching attitude of the aircraft too much up or down for a long period can cause the aircraft to shift into over-speed maneuver or backward flight. In both cases, the aircraft can stall if the pilot does not react in time. Therefore, the steady state pitch attitude knowledge-based feedback system is designed based on the desired airspeed with its relative pitch attitude. Table 2 and Table 3, below, show the analysis results of an example aircraft in 0.9 Vh with heavy gross weight at an altitude of 5,000 feet above the ground. A conservative selection of gain schedule using pitch angle to replace airspeed is shown in Table 4, below.

TABLE 2

Example aircraft center of gravity shift on pitching angle due to speed failure

| No. | Helicopter Mode | Airplane Mode | Pitch Angle Differences from the (Mid, Mid) |
|---|---|---|---|
| A | (Mid, Heavy) | (Mid, Heavy) | Desire angle close to −2 degrees off the desired angle (one degree FWD) |
| B | (Mid, Mid) | (Mid, Mid) | Desire angle close to $\theta_{MM}$ close to 0 degrees |
| C | (Mid, Light) | (Mid, Light) | Desire angle close to +2 degrees off the desired angle (one degree Aft) |

TABLE 3

Example aircraft speed changes on pitching angle due to speed failure

| No. | Helicopter Mode | Airplane Mode | Pitch Angle Differences from the (Mid, Mid) |
|---|---|---|---|
| A | (Mid, Heavy) | (Mid, Heavy) | Desire angle close to −4 degrees off the desired angle (one degree FWD) |
| B | (Mid, Mid) | (Mid, Mid) | Desire angle close to $\theta_{MM}$ close to 0 degrees |
| C | (Mid, Light) | (Mid, Light) | Desire angle close to +4 degrees off the desired angle (one degree Aft) |

TABLE 4

Example aircraft pitching angle schedule due to speed failure

| Speed | Low Speed | Low-Mid | Mid Speed | Mid-High | High Speed |
|---|---|---|---|---|---|
| A | $\theta_{MM} + 6$ | $\theta_{MM} + 4$ | $\theta_{MM} + 2$ | $\theta_{MM}$ | $\theta_{MM} - 2$ |
| B | $\theta_{MM} + 4$ | $\theta_{MM} + 2$ | $\theta_{MM}$ | $\theta_{MM} - 2$ | $\theta_{MM} - 4$ |
| C | $\theta_{MM} + 2$ | $\theta_{MM}$ | $\theta_{MM} - 2$ | $\theta_{MM} - 4$ | $\theta_{MM} - 6$ |

The 2 degrees and 4 degrees differences in the center of gravity weight shift and speed changes shown in FIG. 11 are arbitrary, which can be verified through flight test support. However, catastrophes of speed gain schedule with respect to center of gravity changes due to airspeed sensor failure can be avoided. Also, the pitch angle change circle selection 1108 in FIG. 11 can be very conservatively selected so that the aircraft can safely reach go-home, for example, in speed sensor catastrophe failure situations.

In instances when an airspeed sensor fails on an aircraft, one of main goals is to maintain the aircraft with a very robust feedback system such that the flight performance of the aircraft will not be degraded. The second goal is to consolidate control laws architecture such that the transit situations on all flight control axes no matter in steady state or maneuver flight mode will be minimized.

Figure 12:
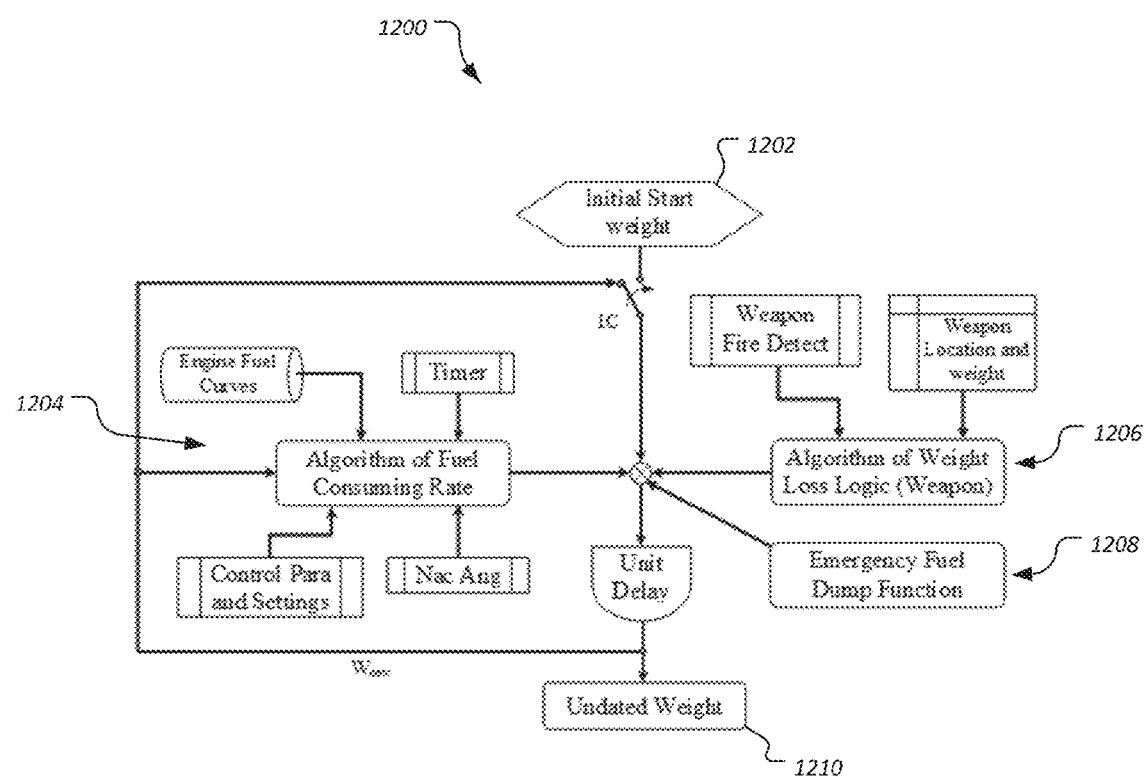
FIG. 12 is a schematic diagram of an algorithm for updating aircraft weight based on fuel consumption rate.

An algorithm of how to update aircraft weight based on fuel consumption rate with respect to time, weapon firing states, emergency fuel dump functions, and/or other is shown in an updated weight flowchart 1200 of FIG. 12. The initial weight of the tiltrotor aircraft 101 before take-off can be initially triggered before the engine starts during a ground run mode. Once initial weight of the tiltrotor aircraft is updated, a new updated weight can be calculated. Initial weight of the tiltrotor aircraft and updated (e.g., real-time) weight of the tiltrotor aircraft can aid in determining tiltrotor aircraft outputs, such as the outputs from the on-board tiltrotor aircraft system 200 of FIG. 2. For example, during flight of the example tiltrotor aircraft 101, inputs to the on-board tiltrotor aircraft system 200 can include an initial weight 1202 of the tiltrotor aircraft 101 before take-off and an updated (e.g., real-time) weight of the tiltrotor aircraft 101 during a flight time instant of the flight using a fuel consumption algorithm 1204. In some implementations, such as depicted in FIG. 11, additional inputs can include tiltrotor aircraft weight adjustments based on a weapon system weight algorithm 1206 and/or an emergency fuel dump function 1208. The collective inputs to the on-board tiltrotor aircraft system 200 can then determine an updated weight 1210 factoring in the multiple weight-affecting inputs of the tiltrotor aircraft 101 to the system 200.

A number of implementations have been described. Nevertheless, it will be understood that various modifications may be made without departing from the spirit and scope of the disclosure.

What is claimed is:

1. An on-board tiltrotor aircraft system for determining center of gravity of the tiltrotor aircraft, the system comprising:
    one or more computers; and
    a computer-readable medium storing instructions executable by the one or more computers to perform operations comprising:
        storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity, and vertical center of gravity;
        receiving a plurality of input signals from a corresponding plurality of on-board sensors, the plurality of input signals representing characteristics of the tiltrotor aircraft;
        determining one or more tiltrotor aircraft parameters from the plurality of input signals;
        identifying, from the multi-dimensional matrix mapping, a longitudinal center of gravity, a lateral center of gravity, and a vertical center of gravity that corresponds to the determined one or more tiltrotor aircraft parameters; and
        providing the identified longitudinal center of gravity, the identified lateral center of gravity, and the identified vertical center of gravity in response to receiving the plurality of input signals.

2. The system of claim 1, wherein the plurality of on-board sensors comprises at least one of a nacelle settings sensor, a flap settings sensor, a weight sensor, a flight sensor, a flight control sensor, an engine state sensor, or a mode sensor.

3. The system of claim 1, wherein the multi-dimensional matrix comprises a longitudinal center of gravity matrix, and wherein the operations further comprise:
  identifying, for the tiltrotor aircraft operating in a helicopter mode, a first plurality of longitudinal centers of gravity corresponding to a first plurality of gross weight-fuselage direction pairs;
  identifying, for the tiltrotor aircraft operating in an airplane mode, a second plurality of longitudinal centers of gravity corresponding to a second plurality of gross weight-fuselage direction pairs;
  storing, in the longitudinal center of gravity matrix, the first plurality of gross weight-fuselage direction pairs and the second plurality of gross weight-fuselage direction pairs as tiltrotor aircraft parameters; and
  storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively.

4. The system of claim 1, wherein the multi-dimensional matrix comprises a lateral center of gravity matrix, and wherein the operations further comprise:
  determining lateral center of gravity limits for the tiltrotor aircraft based on one or more of the plurality of tiltrotor aircraft parameters; and
  storing the lateral center of gravity limits in the lateral center of gravity matrix.

5. The system of claim 1, wherein the multi-dimensional matrix comprises a vertical center of gravity matrix, and wherein the operations further comprise:
  identifying, for the tiltrotor aircraft operating in a helicopter mode, a first plurality of vertical centers of gravity corresponding to a first plurality of nacelle tilt directions;
  identifying, for the tiltrotor aircraft operating in an airplane mode, a second plurality of vertical centers of gravity corresponding to a second plurality of nacelle tilt directions;
  storing, in the vertical center of gravity matrix, the first plurality of nacelle tilt directions and the second plurality of nacelle tilt directions; and
  storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively.

6. The system of claim 1, wherein the identified longitudinal center of gravity, the identified lateral center of gravity and the identified vertical center of gravity are identified in real time during flight of the tiltrotor aircraft.

7. The system of claim 1, wherein the operations further comprise determining, at a flight time instant, a rate of fuel consumption of the tiltrotor aircraft based, in part, on the identified longitudinal center of gravity, the identified lateral center of gravity, and the identified vertical center of gravity, each identified at the flight time instant.

8. The system of claim 7, wherein the operations further comprise determining, at the flight time instant, flight mode adjustments based, in part, on the determined rate of fuel consumption.

9. The system of claim 1, wherein the on-board tiltrotor aircraft system is integrated into an existing computer system of the tiltrotor aircraft.

10. A computer-implemented method for determining center of gravity of a tiltrotor aircraft, the method comprising:
  storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity, and vertical center of gravity;
  receiving a plurality of input signals from a corresponding plurality of on-board sensors, the plurality of input signals representing characteristics of the tiltrotor aircraft;
  determining one or more tiltrotor aircraft parameters from the plurality of input signals;
  identifying, from the multi-dimensional matrix mapping, a longitudinal center of gravity, a lateral center of gravity, and a vertical center of gravity that corresponds to the determined one or more tiltrotor aircraft parameters; and
  providing the identified longitudinal center of gravity, the identified lateral center of gravity, and the identified vertical center of gravity in response to receiving the plurality of input signals.

11. The method of claim 10, wherein the plurality of on-board sensors comprises at least one of a nacelle settings sensor, a flap settings sensor, a weight sensor, a flight sensor, a flight control sensor, an engine state sensor, or a mode sensor.

12. The method of claim 10, further comprising:
  identifying, for the tiltrotor aircraft operating in a helicopter mode, a first plurality of longitudinal centers of gravity corresponding to a first plurality of gross weight-fuselage direction pairs;
  identifying, for the tiltrotor aircraft operating in an airplane mode, a second plurality of longitudinal centers of gravity corresponding to a second plurality of gross weight-fuselage direction pairs;
  storing, in a longitudinal center of gravity matrix of the multi-dimensional matrix, the first plurality of gross weight-fuselage direction pairs and the second plurality of gross weight-fuselage direction pairs as tiltrotor aircraft parameters; and
  storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively.

13. The method of claim 10, further comprising:
  determining lateral center of gravity limits for the tiltrotor aircraft based on one or more of the plurality of tiltrotor aircraft parameters; and
  storing the lateral center of gravity limits in a lateral center of gravity matrix of the multi-dimensional matrix.

14. The method of claim 10, further comprising:
identifying, for the tiltrotor aircraft operating in a helicopter mode, a first plurality of vertical centers of gravity corresponding to a first plurality of nacelle tilt directions;
identifying, for the tiltrotor aircraft operating in an airplane mode, a second plurality of vertical centers of gravity corresponding to a second plurality of nacelle tilt directions;
storing, in a vertical center of gravity matrix of the multi-dimensional matrix, the first plurality of nacelle tilt directions and the second plurality of nacelle tilt directions; and
storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively.

15. The method of claim 10, further comprising determining, at a flight time instant, a rate of fuel consumption of the tiltrotor aircraft based, in part, on the identified longitudinal center of gravity, the identified lateral center of gravity, and the identified vertical center of gravity, each identified at the flight time instant.

16. The method of claim 10, further comprising determining, at a flight time instant, a pitching angle gain schedule of the tiltrotor aircraft based, in part, on the identified centers of gravity with respect to a speed sensor failure condition.

17. A non-transitory, computer-readable medium storing instructions operable when executed to cause at least one processor to perform operations for determining center of gravity of a tiltrotor aircraft, the operations comprising:
storing a multi-dimensional matrix mapping a plurality of tiltrotor aircraft parameters to a plurality of three-dimensional (3D) centers of gravity of the tiltrotor aircraft, each 3D center of gravity comprising a respective longitudinal center of gravity, lateral center of gravity, and vertical center of gravity;
receiving a plurality of input signals from a corresponding plurality of on-board sensors, the plurality of input signals representing characteristics of the tiltrotor aircraft;
determining one or more tiltrotor aircraft parameters from the plurality of input signals;
identifying, from the multi-dimensional matrix mapping, a longitudinal center of gravity, a lateral center of gravity, and a vertical center of gravity that corresponds to the determined one or more tiltrotor aircraft parameters; and
providing the identified longitudinal center of gravity, the identified lateral center of gravity, and the identified vertical center of gravity in response to receiving the plurality of input signals.

18. The non-transitory, computer-readable medium of claim 17, wherein the multi-dimensional matrix comprises a longitudinal center of gravity matrix, and wherein the operations further comprise:
identifying, for the tiltrotor aircraft operating in a helicopter mode, a first plurality of longitudinal centers of gravity corresponding to a first plurality of gross weight-fuselage direction pairs;
identifying, for the tiltrotor aircraft operating in an airplane mode, a second plurality of longitudinal centers of gravity corresponding to a second plurality of gross weight-fuselage direction pairs;
storing, in the longitudinal center of gravity matrix, the first plurality of gross weight-fuselage direction pairs and the second plurality of gross weight-fuselage direction pairs as tiltrotor aircraft parameters; and
storing, in the longitudinal center of gravity matrix, the first plurality of longitudinal centers of gravity and the second plurality of longitudinal centers of gravity corresponding to the first plurality of gross weight-fuselage direction pairs and the second plurality of gross weight-fuselage direction pairs, respectively, in the helicopter mode and the airplane mode, respectively.

19. The non-transitory, computer-readable medium of claim 17, wherein the multi-dimensional matrix comprises a lateral center of gravity matrix, and wherein the operations further comprise:
determining lateral center of gravity limits for the tiltrotor aircraft based on one or more of the plurality of tiltrotor aircraft parameters; and
storing the lateral center of gravity limits in the lateral center of gravity matrix.

20. The non-transitory, computer-readable medium of claim 17, wherein the multi-dimensional matrix comprises a vertical center of gravity matrix, and wherein the operations further comprise:
identifying, for the tiltrotor aircraft operating in a helicopter mode, a first plurality of vertical centers of gravity corresponding to a first plurality of nacelle tilt directions;
identifying, for the tiltrotor aircraft operating in an airplane mode, a second plurality of vertical centers of gravity corresponding to a second plurality of nacelle tilt directions;
storing, in the vertical center of gravity matrix, the first plurality of nacelle tilt directions and the second plurality of nacelle tilt directions; and
storing, in the longitudinal center of gravity matrix, the first plurality of vertical centers of gravity and the second plurality of vertical centers of gravity corresponding to the first plurality of nacelle tilt directions and the second plurality of nacelle tilt directions, respectively, in the helicopter mode and the airplane mode, respectively.

* * * * *